(12) United States Patent
Garcarz et al.

(10) Patent No.: US 11,671,374 B2
(45) Date of Patent: Jun. 6, 2023

(54) SAAS APPLICATION CLUSTERING FOR PATH PROBING TO SUPPORT APPLICATION-BASED ROUTING

(71) Applicant: Cisco Technology, Inc., San Jose, CA (US)

(72) Inventors: Michal Wladyslaw Garcarz, Cracow (PL); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/375,209

(22) Filed: Jul. 14, 2021

(65) Prior Publication Data
US 2023/0019274 A1    Jan. 19, 2023

(51) Int. Cl.
| | | |
|---|---|---|
| *H04L 47/24* | (2022.01) | |
| *H04L 45/00* | (2022.01) | |
| *H04L 45/302* | (2022.01) | |
| *H04L 43/12* | (2022.01) | |

(52) U.S. Cl.
CPC .............. *H04L 47/24* (2013.01); *H04L 43/12* (2013.01); *H04L 45/306* (2013.01); *H04L 45/46* (2013.01)

(58) Field of Classification Search
CPC ....... H04L 47/24; H04L 43/12; H04L 45/306; H04L 45/46
See application file for complete search history.

(56) References Cited

U.S. PATENT DOCUMENTS

| | | |
|---|---|---|
| 2009/0292802 A1 | 11/2009 | Popescu et al. |
| 2012/0054363 A1 | 3/2012 | Hart |
| 2012/0218907 A1* | 8/2012 | Chen ................... H04L 41/0893 370/252 |
| 2016/0294664 A1* | 10/2016 | Manghirmalani ...... H04L 43/12 |
| 2020/0382402 A1* | 12/2020 | Kolar ..................... H04L 43/12 |
| 2020/0382429 A1 | 12/2020 | Bajaj |
| 2021/0067489 A1* | 3/2021 | Jayawardena ...... H04L 63/0263 |
| 2021/0083948 A1 | 3/2021 | Paruchuri et al. |
| 2021/0168068 A1 | 6/2021 | Shenoy |
| 2021/0218042 A1* | 7/2021 | Tsukamoto ....... H01M 8/04932 |
| 2021/0218642 A1* | 7/2021 | Pasupathy ............ H04L 45/123 |

OTHER PUBLICATIONS

Jagli, et al., "Clustering Model for Evaluating SaaS on the Cloud", International Journal of Application or Innovation in Engineering & Management, vol. 2, Issue 12, Dec. 2013, pp. 346-351.

(Continued)

*Primary Examiner* — Kibrom T Hailu
(74) *Attorney, Agent, or Firm* — Behmke Innovation Group LLP; Kenneth J. Heywood; Jonathon P. Western (57) ABSTRACT

In one embodiment, a device clusters traffic characteristics of traffic associated with a plurality of online applications into one or more clusters. The device determines representative traffic characteristics for a particular cluster in the one or more clusters. The device generates, based on the representative traffic characteristics, a probing strategy for the plurality of online applications associated with the particular cluster. The device causes path probes to be sent along one or more network paths in accordance with the probing strategy.

18 Claims, 9 Drawing Sheets

(56) References Cited

OTHER PUBLICATIONS

Bey, et al., "A Novel Clustering-based Approach for SaaS Services Discovery in Cloud Environment", In Proceedings of the 19th International Conference on Enterprise Information Systems (ICEIS 2017)—vol. 1, pp. 546-553, Science and Technology Publications, Lda.

Jagli, et al., CBC Approach for Evaluating Potential SaaS on the Cloud, VESIT, International Technological Conference—2014 (I-TechCON), Jan. 3-4, 2014, pp. 43-49.

* cited by examiner

SAAS APPLICATION CLUSTERING FOR PATH PROBING TO SUPPORT APPLICATION-BASED ROUTING

TECHNICAL FIELD

The present disclosure relates generally to computer networks, and, more particularly, to software-as-a-service (SaaS) application clustering for path probing to support application-based routing.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Application-aware routing used in SD-WANs typically relies on probing of the network paths used by traffic for a particular application, to detect and mitigate against SLA violations. However, the number of software-as-a-service (SaaS) applications, as well as their corresponding data centers located throughout the world, is rapidly growing. Consequently, the number of probes needed to support application-aware routing is continually growing.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device clusters traffic characteristics of traffic associated with a plurality of online applications into one or more clusters. The device determines representative traffic characteristics for a particular cluster in the one or more clusters. The device generates, based on the representative traffic characteristics, a probing strategy for the plurality of online applications associated with the particular cluster. The device causes path probes to be sent along one or more network paths in accordance with the probing strategy

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
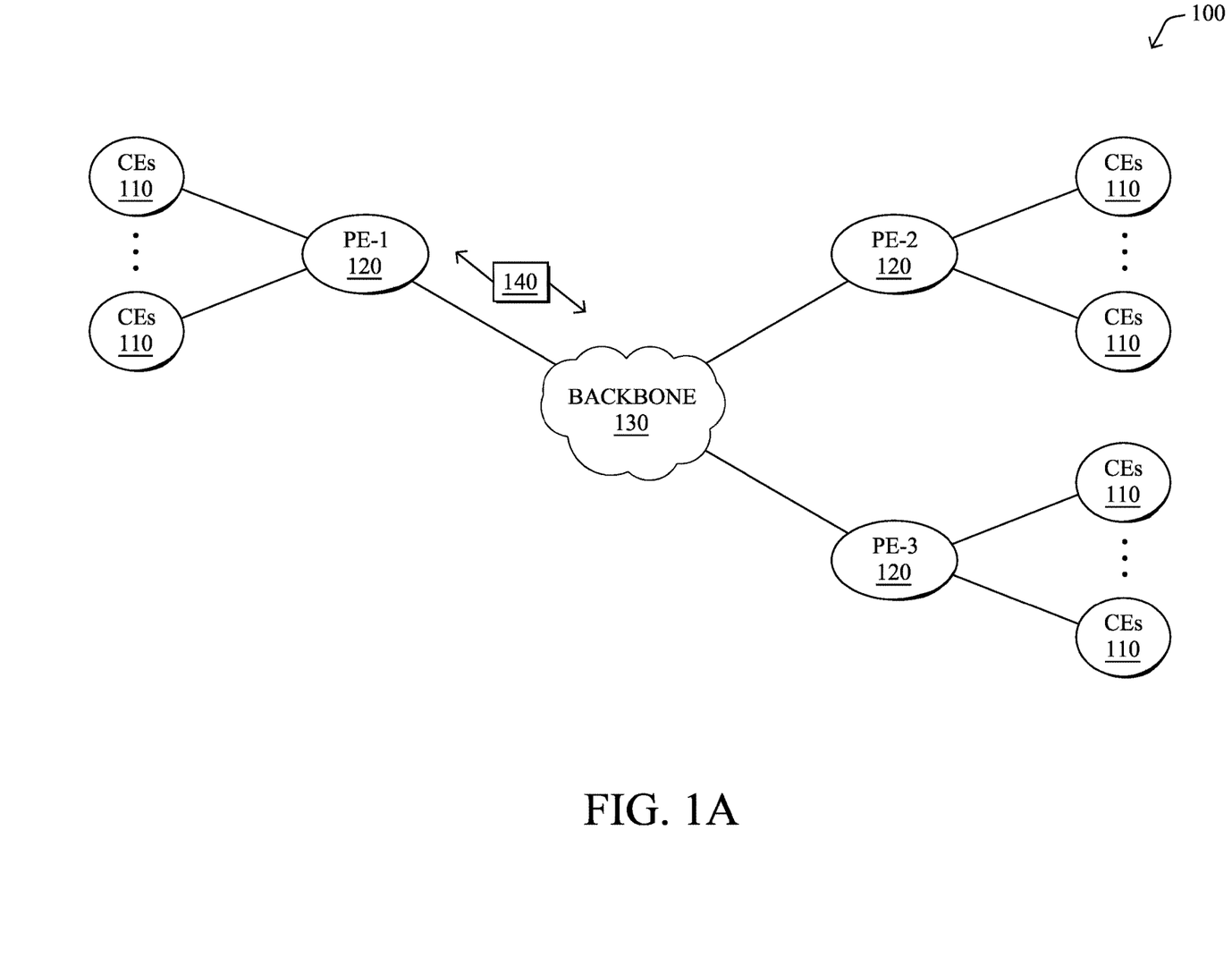
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
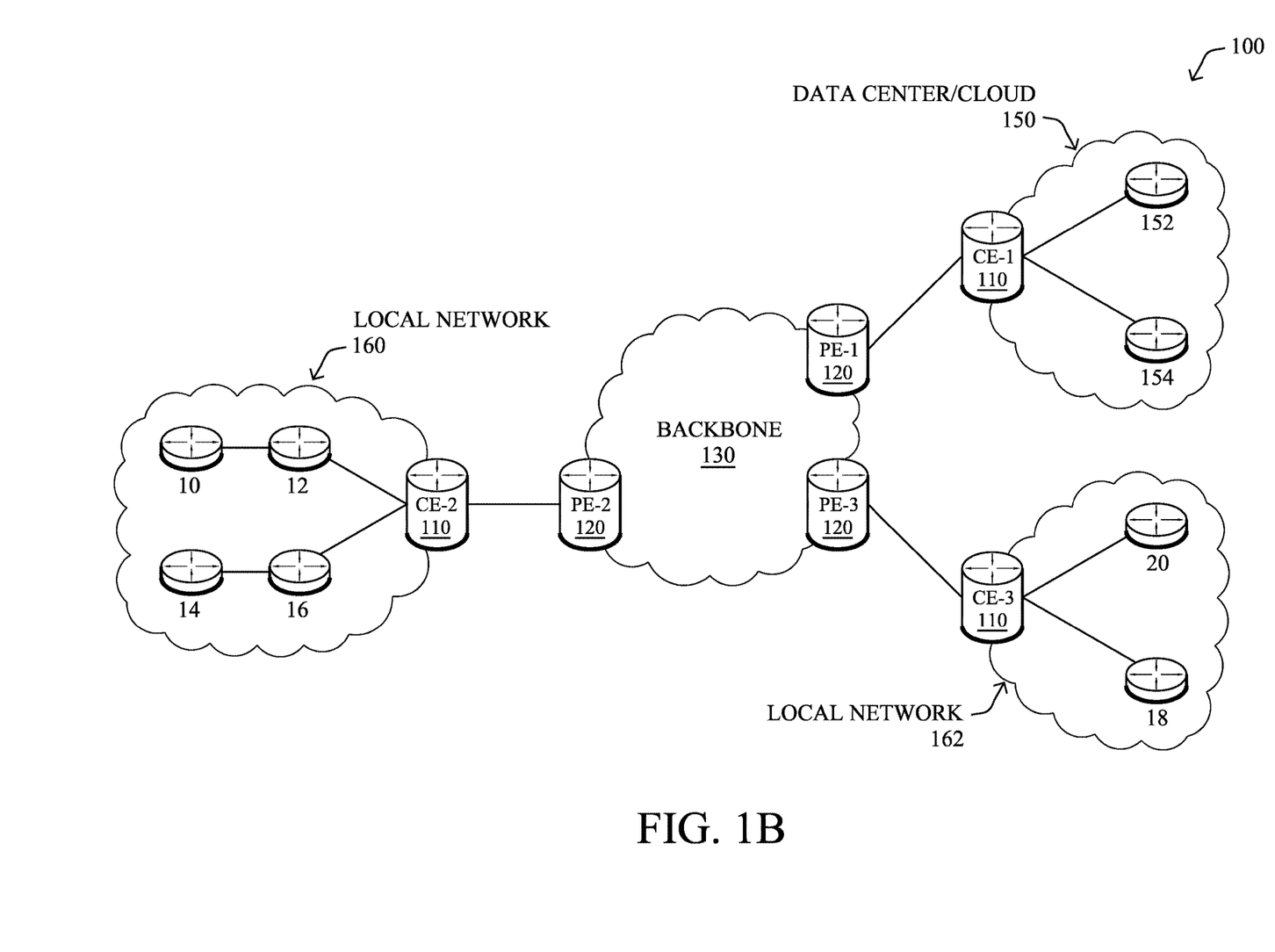

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
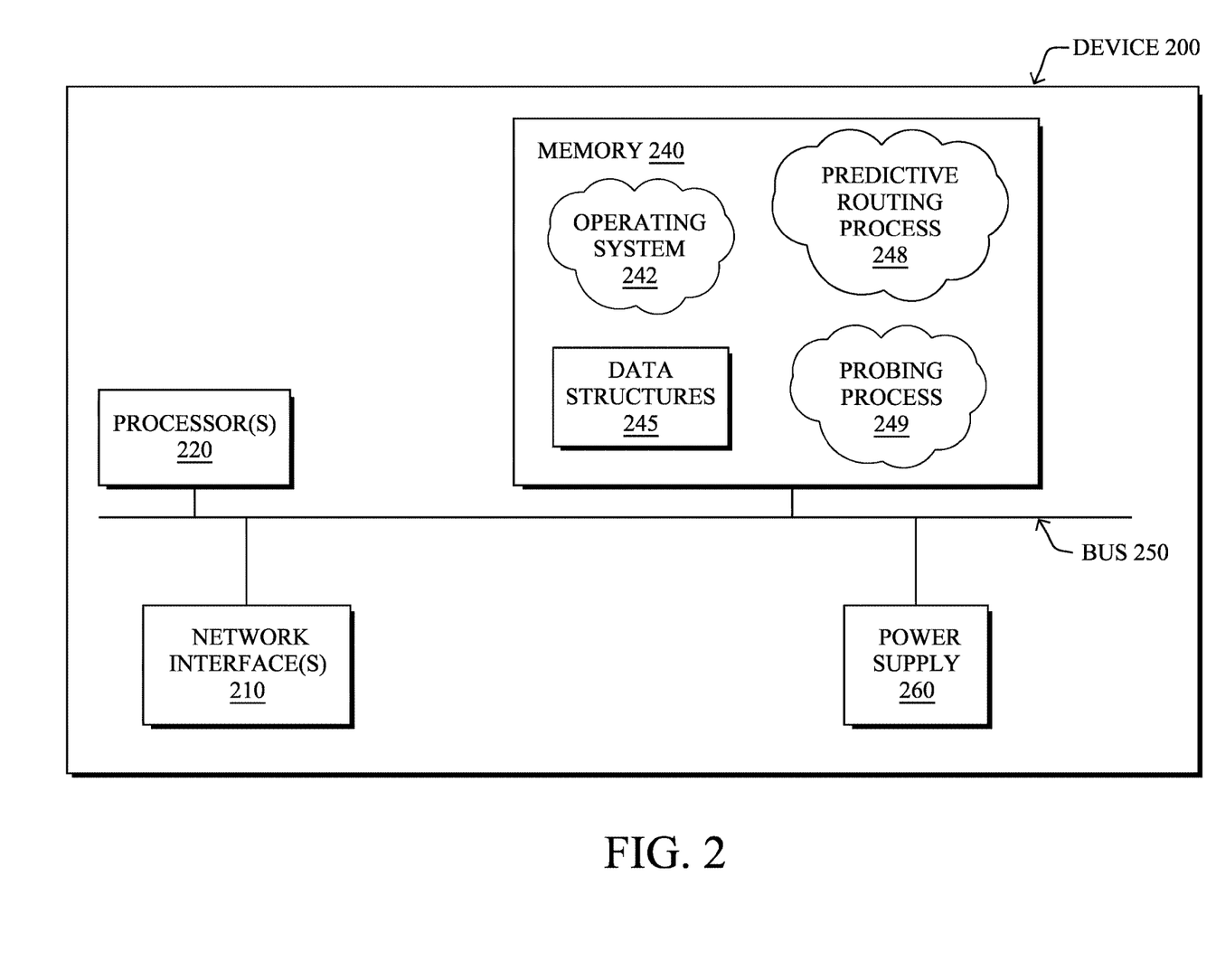
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a probing process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or a probing process 249 may include computer executable instructions that, when executed by processor(s) 220, cause device 200 to perform the techniques described herein. To do so, in some embodiments, predictive routing process 248 and/or a probing process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or a probing process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or a probing process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
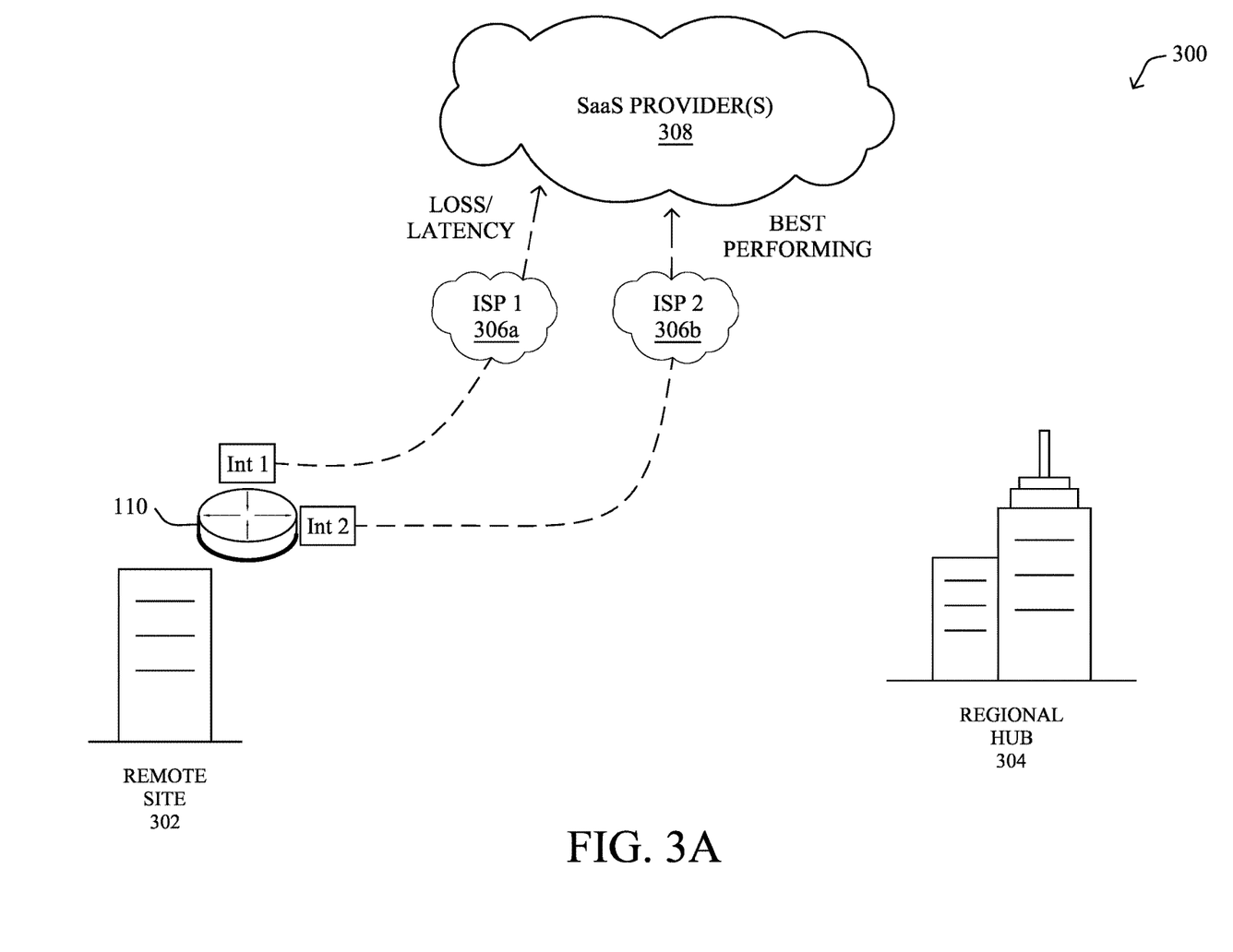
FIGS. 3A-3B illustrate example network deployments.
Figure 3B:
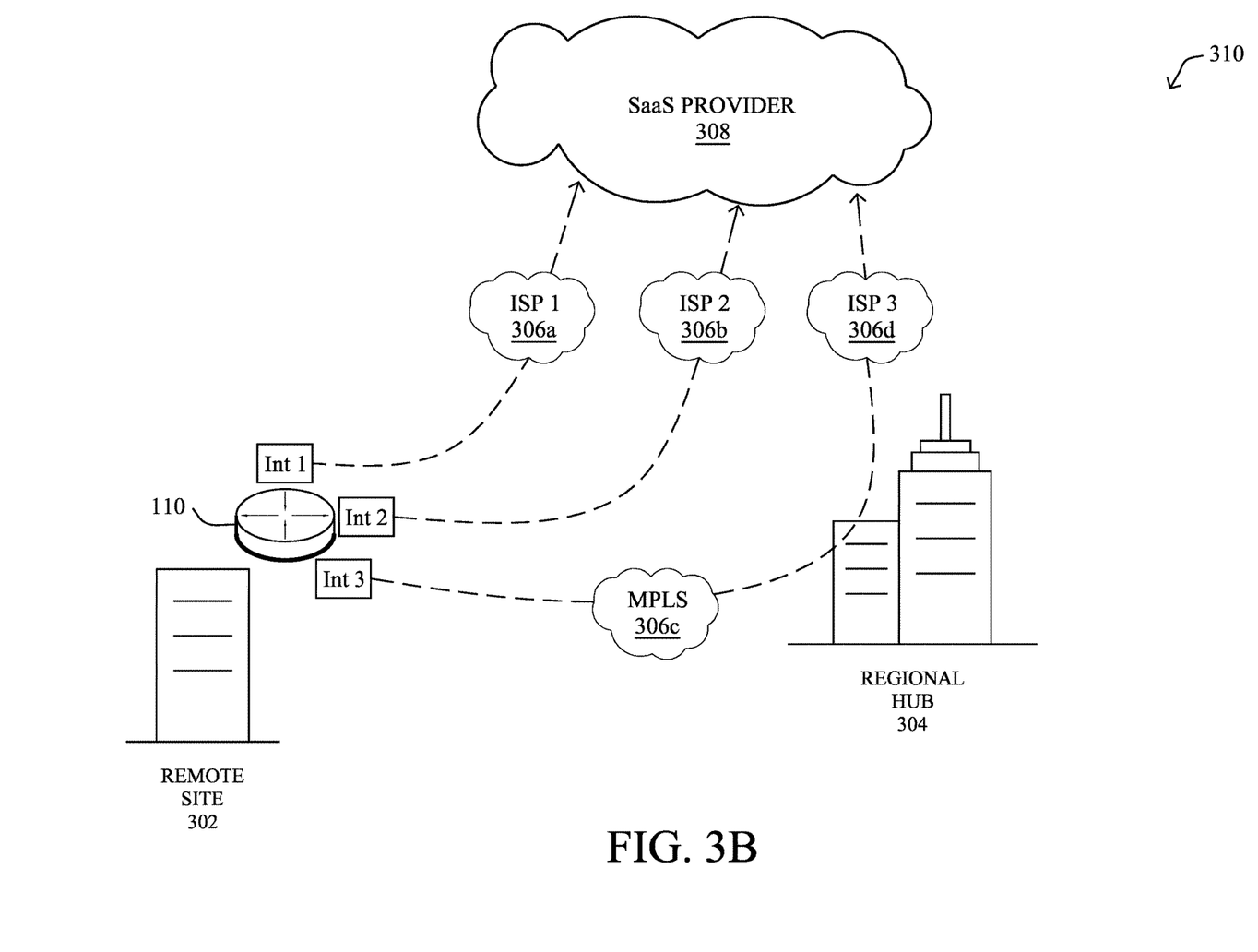

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL; 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
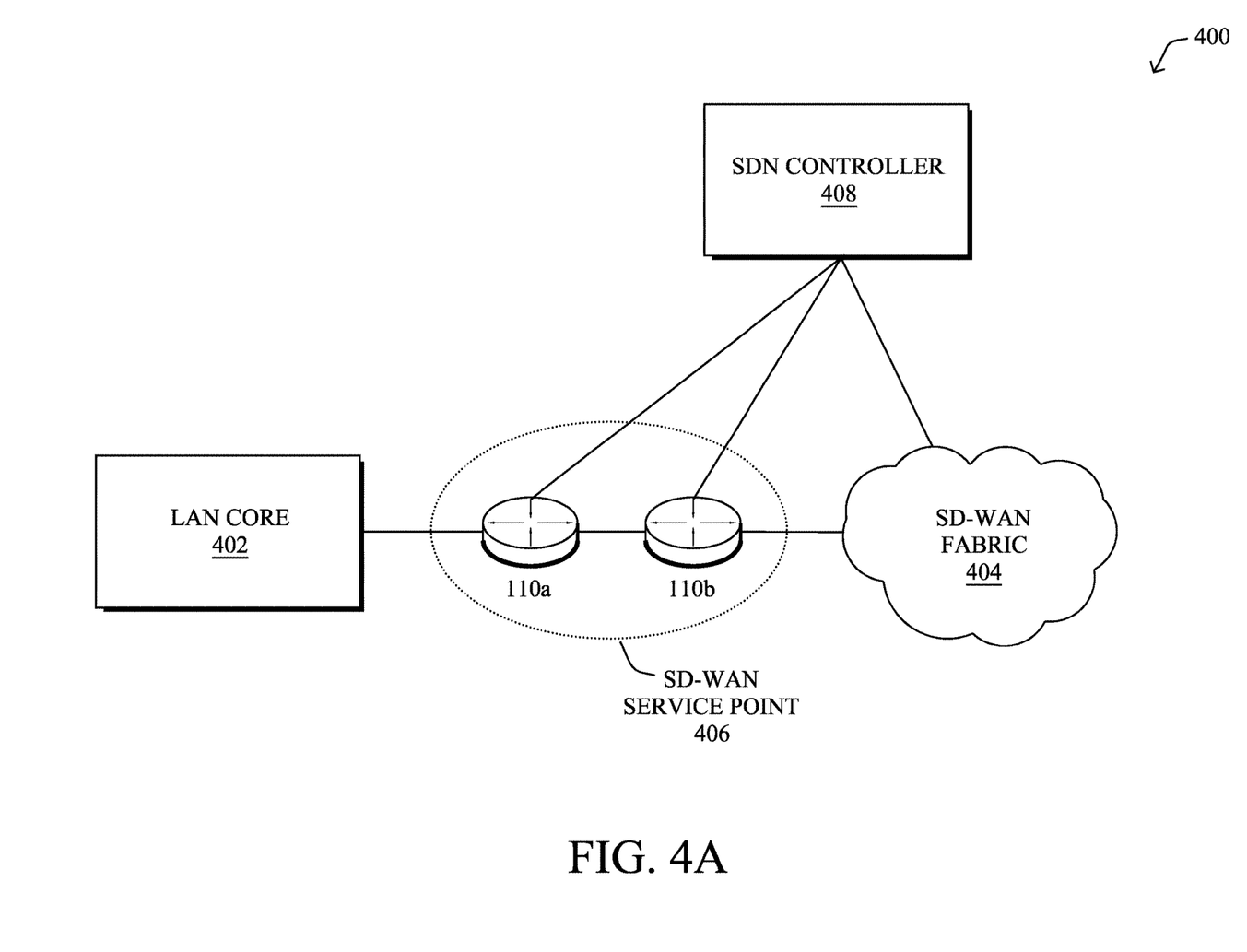
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furtheimore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
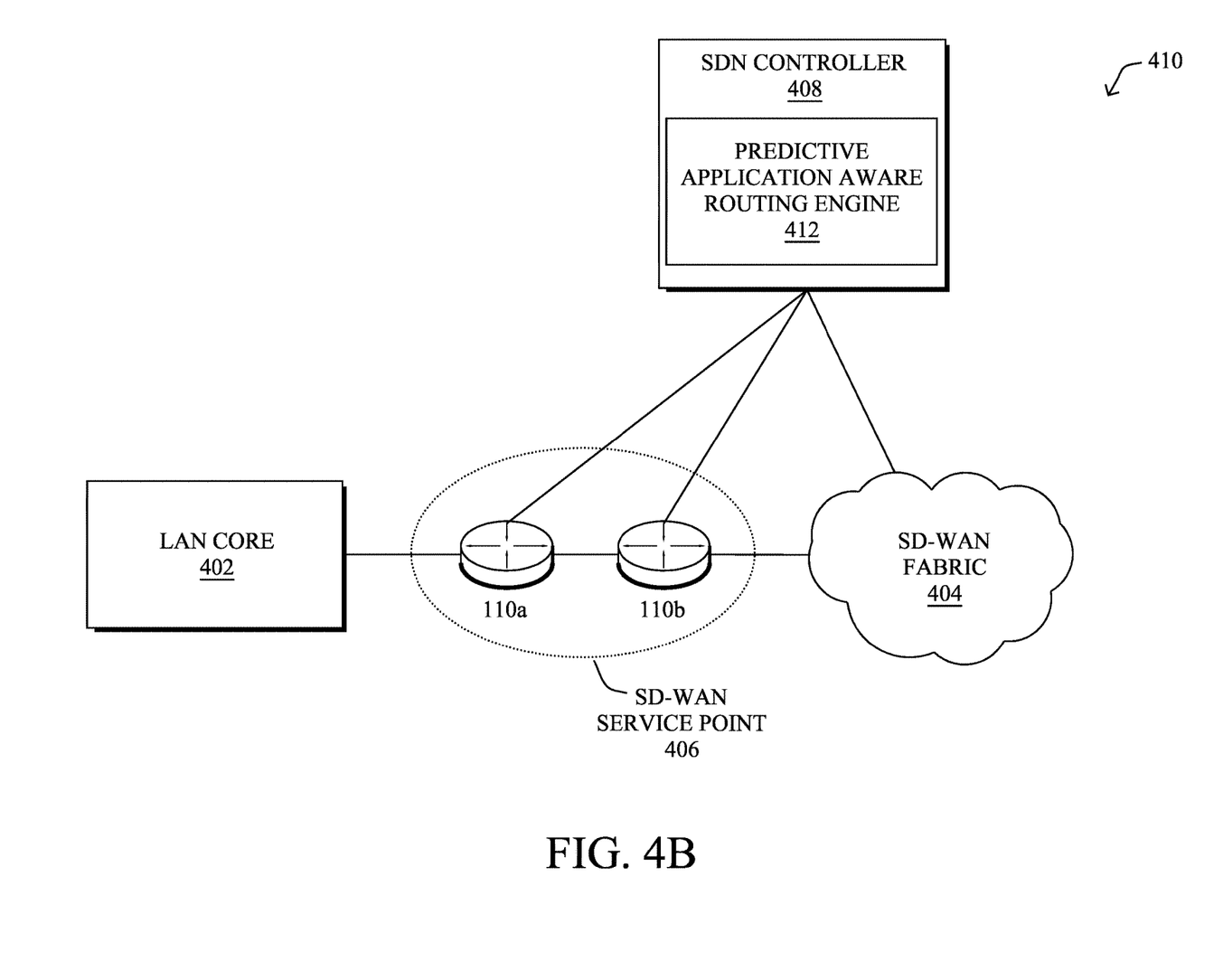

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, modern SaaS applications are delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront PoPs, etc.), in reality it might run in a single region/location and user experience might vary greatly based on the location.

To determine the QoE for a particular SaaS application, various approaches are possible such as:

Obtaining user feedback directly from the application

Applying traffic analytics, such as by analyzing Netflow records that include extra metrics like Application Response Time (ART)

Sending synthetic path probes to measure networking metrics to each SaaS application from each location. These probes are 'synthetic' in that they seek to mimic the actual characteristics of the traffic of the application under scrutiny.

The first approach above is rarely used today because of its complexity. In addition, relying on direct user feedback to drive routing decisions also requires supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

One of the major limitations of relying on probing to drive application-aware routing decisions relates to the scale and variety of SaaS applications. More specifically, tracking every single SaaS application and its relative QoE for each location, time period, and/or other dimensions, can quickly become cumbersome.

SaaS Application Clustering for Path Probing to Support Application-Based Routing The techniques herein introduce mechanisms to reduce the overhead of path probing used to support (predictive) application-based routing. In some aspects, traffic for different SaaS applications can be clustered based on their similar characteristics, such as time, location, etc. In further aspects, synthetic path probes may be Illustratively, the techniques described herein may be performed by hardware, software, and/or firmware, such as in accordance with probing process 249, which may include computer executable instructions executed by the processor 220 (or independent processor of interfaces 210) to perform functions relating to the techniques described herein, in conjunction with predictive routing process 248.

Specifically, according to various embodiments, a device clusters traffic characteristics of traffic associated with a plurality of online applications into one or more clusters. The device determines representative traffic characteristics for a particular cluster in the one or more clusters. The device generates, based on the representative traffic characteristics, a probing strategy for the plurality of online applications associated with the particular cluster. The device causes path probes to be sent along one or more network paths in accordance with the probing strategy.

Operationally, a key aspect of the techniques herein is that certain SaaS applications exhibit similar network path characteristics. This presents an opportunity to perform probe sampling for each group of similar applications, thereby drastically reducing the number of probes.

Figure 5:
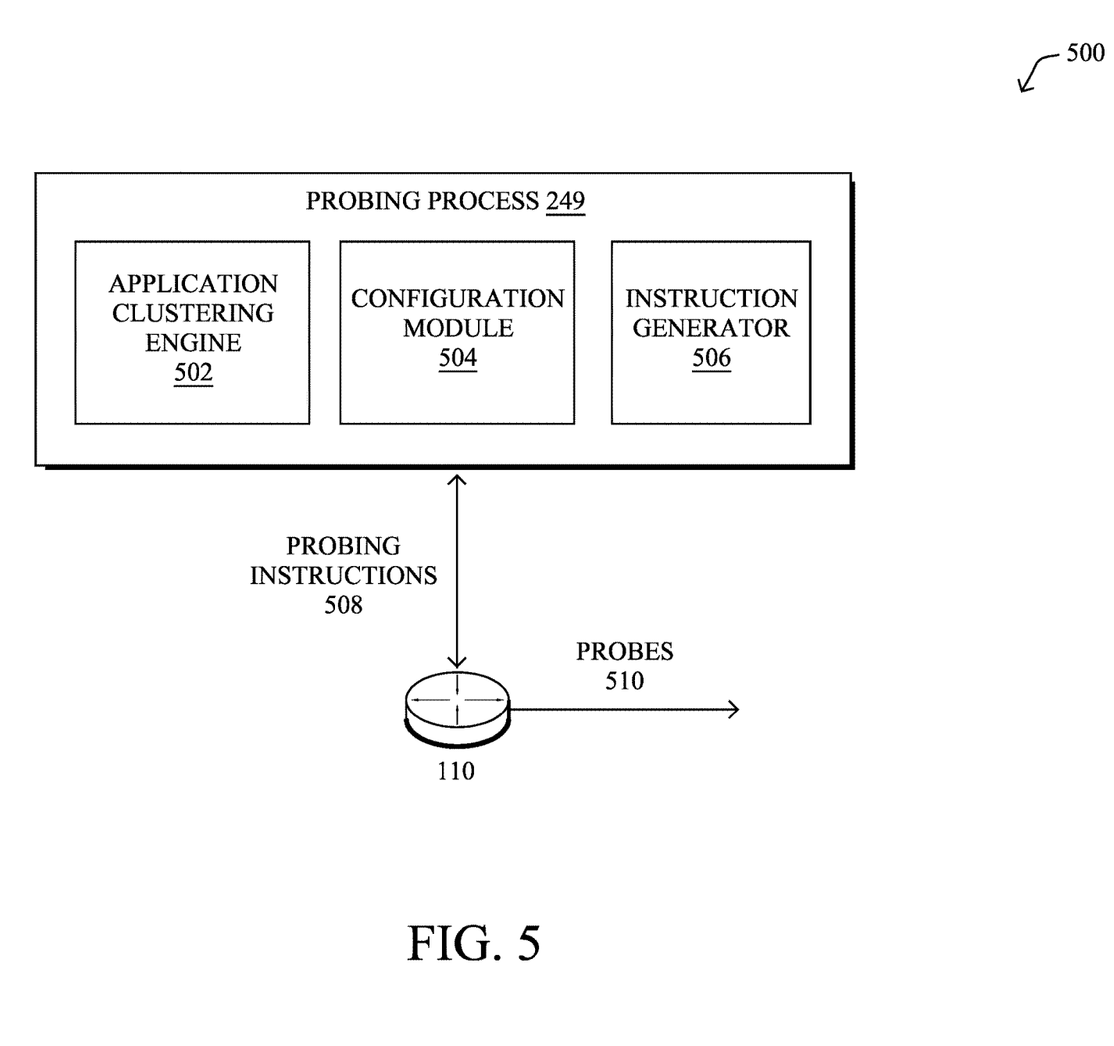
FIG. 5 illustrates an example architecture for probing a network path.

By way of example, consider the various Google applications available: YouTube, YouTube HD, Gmail, Gmail Chat, Google Calendar, Google Maps, etc. Rather than probing each application separately, application clustering engine 502 may form the following application clusters:

Cluster 1: youtube, youtube_hd
Cluster 2: google_maps, google_earth, google_skymap
Cluster 3: gmail, gstatic, gmail_chat, gmail_basic, gmail_drive, gmail_mobile
Cluster 4: google_photos, google_picasa, google_spaces, google_desktop
Cluster 5: googlebot, google_ads, google_gen, google_play, google_plus, google_tags, google_spaces, google_toolbar, google calendar, google_accounts This affords the system to send probes on a per-cluster basis, as opposed to on a per-application basis. The probe results can then be used to drive application-aware routing decisions, such as those made by predictive application aware routing engine 412.

FIG. 5 illustrates an example architecture 500 for probing a network path, according to various embodiments. At the core of architecture 500 is probing process 249, which may be executed by a controller for a network or another device in communication therewith. For instance, probing process 249 may be executed by a controller for a network (e.g., SDN controller 408 in FIGS. 4A-4B), a particular networking device in the network (e.g., a router, etc.), another device or service in communication therewith, or the like, to provide a supervisory service to the network. More specifically, probing process 249 may operate in conjunction with a predictive application aware routing engine, such as predictive application aware routing engine 412, or directed implemented as a component thereof, in some embodiments.

As shown, probing process 249 may include any or all of the following components: application clustering engine 502, configuration module 504, and/or instruction generator 506. As would be appreciated, the functionalities of these components may be combined or omitted, as desired. In addition, these components may be implemented on a singular device or in a distributed manner, in which case the combination of executing devices can be viewed as their own singular device for purposes of executing probing process 249.

During execution, application clustering engine 502 is configured to cluster SaaS applications such that probing can be performed collectively for a given cluster, thereby reducing the number of required probes to access the QoE of the applications. Such probing may be used to support more precise application-based routing capabilities for SASE/SD-WAN solutions (e.g., predictive application aware routing engine 412).

According to various embodiments, application clustering engine 502 may receive a probing optimization request from an SDN controller, a user interface, or another source, that indicates the applications of interest for which active probing is required. In turn, application clustering engine 502 may cluster these applications based on their traffic characteristics, any specified parameters in the request, or other factors. For instance, application clustering engine 502 may cluster the applications based on their locations, timing information, path metrics (e.g., jitter, loss, delays), application QoE, service (e.g., Google, Amazon, etc.), infrastructure (e.g., service provider, etc.), user interactions, combinations thereof, or the like.

Application clustering engine 502 may leverage any number of different clustering approaches, in various embodiments. In one embodiment, application clustering engine 502 may use a density-based approach (e.g., DB-SAN) in a space reflecting the properties of path such as the delay, loss, jitter, or even observed QoE provided by the application. By minimizing the distance between vectors that represent the path property, this allows for the grouping of SaaS paths that are "similar" within the teachings herein. Note that application clustering engine 502 may represent each variable using a specific statistical moment such as a percentile or even a Probability Density Function (PDF).

In further embodiments, application clustering engine 502 may apply a clustering approach that computes N-number of clusters, with N being a set parameter. For instance, application clustering engine 502 may leverage k-Means clustering or a similar approach. In yet another embodiment the value 'k' may be governed by the amount of resources available on the networking device triggering the probes, such as router 110 shown. For example, a small constrained router connected to the network with a noisy low bandwidth link may be required to only send a limited number of probes, thus limiting the number of clustering K, at the cost of losing accuracy when sending probes.

Since clustering may vary over time simply because SaaS application do move across clouds, the clustering operation of application clustering engine 502 may be triggered on a regular basis so as to recompute the set of clusters. In yet another embodiment, external event may be used to detect inappropriate clustering and trigger a re-performance of the clustering by application clustering engine 502. For example, suppose that a set of applications or services S1, S2, . . . Sn are grouped together and a service Si is suddenly moved to another location, making the clustering no longer valid. Such a condition may be detected by probing process 249, if the path characteristic suddenly changes using a change point detection machine learning algorithm. Such an even may then be used to re-trigger the clustering computation.

In some embodiments, as noted, the clustering by application clustering engine 502 may be region or location-specific, even for a given application, as service locations and their QoE may vary throughout the world. For example, it was shown during experimentation that the cluster memberships may be different for different regions and can also vary over time:

Location=Poland/Warsaw
Cluster 1: google_maps, google_earth
Cluster 2: gmail, gstatic, gmail_chat, gmail_basic, gmail_drive, gmail_mobile, google_skymap
Location=France/Paris
Cluster 1: google_maps, google_earth, google_skymap
Cluster 2: gmail, gstatic, gmail_chat, gmail_basic, gmail_drive, gmail_mobile, google_skymap In this particular example, application "google_skymap" exhibited different QoE (and typical network metrics like loss/jitter/latency) for clients connecting from Poland/Warsaw than for clients connecting from France/Paris. Thus, application clustering engine 502 may take location into account when performing its clustering, in various embodiments.

In another embodiment, application clustering engine 502 may also take into account different time periods/timeframes, when forming application clusters. For instance, application clustering engine 502 may form the following clusters: Location Poland/Warsaw between 16:00-18:00 weekdays Cluster 1: google_maps, google_earth
Cluster 2: gmail, gstatic, gmail_chat, gmail_basic, gmail_drive, is gmail_mobile, google_skymap
Location=France/Paris between 10:00-17:00 Saturdays
Cluster 1: google_maps, google_earth, google_skymap
Cluster 2: gmail, gstatic, gmail_chat, gmail_basic, gmail_drive, gmail_mobile In other words, the "google_skymap" SaaS application for clients connecting from Poland/Warsaw will be more similar to "gmail*" application during the week. On weekends, however, the pattern changes and for the same location "google_skymap" is more similar to "google_maps" group.

According to various embodiments, probing process 249 may also include configuration module 504, which is responsible for generating a probing strategy, based on the clusters identified by application clustering engine 502. More specifically, configuration module 504 may determine when, where, and how to probe for any given cluster formed by application clustering engine 502. For instance, in the above cluster examples, configuration module 504 may determine that "google_skymap" should rely on probes for the first application cluster above for certain times/locations, and on probes for the second cluster above for other times/locations. In other words, configuration module 504 may look to representative characteristics of a given cluster, to devise the appropriate probing strategy for that cluster.

In some embodiments, configuration module 504 may also allow a user to provide input as to how application clustering engine 502 should cluster applications and/or configuration module 504 is to generate a corresponding probing strategy for any given cluster. For instance, configuration module 504 may provide data to a user interface regarding the set of clusters from application clustering engine 502, along with the statistical properties for the similar paths in the clusters. The user may also specify the probe frequency for each cluster according to their relative level of criticality for the user. Conversely, the user may reject a clustering and then specify how the applications related to the rejected clustering should be re-assigned to another cluster. In yet another embodiment, the user may specify a number of clusters that are allowed, so as to further limit the potential number of probes.

Probing process 249 may also include instruction generator 506, which is primarily responsible for causing probes to be sent in the network according to the probing strategy devised by configuration module 504. For instance, instruction generator 506 may send probing instructions 508 to the networking equipment responsible for the probing, such as router 110. In turn, router 110 may send probes 510 along one or more paths in the network, as instructed (e.g., by sending probes of a set size, timing, frequency, destination, etc.). Note that probing instructions 508 may also be sent either directly to the networking equipment or indirectly, such as via an SDN controller or other supervisory service.

Instruction generator 506 may also re-send probing instructions 508 in a dynamic manner, such as when the corresponding application cluster changes (e.g., due to application clustering engine 502 re-performing its clustering) or the probing strategy for that cluster changes (e.g., due to user input, etc.).

As would be appreciated, the above approach is not limited to predictive routing systems, but could also be used for application-aware reactive routing systems, as well. For instance, the above approach could be used to allow a user to decide when and how to group application probes, as well as when to send active probes for a given cluster, to support reactive routing decisions based on the probing results.

Figure 6:
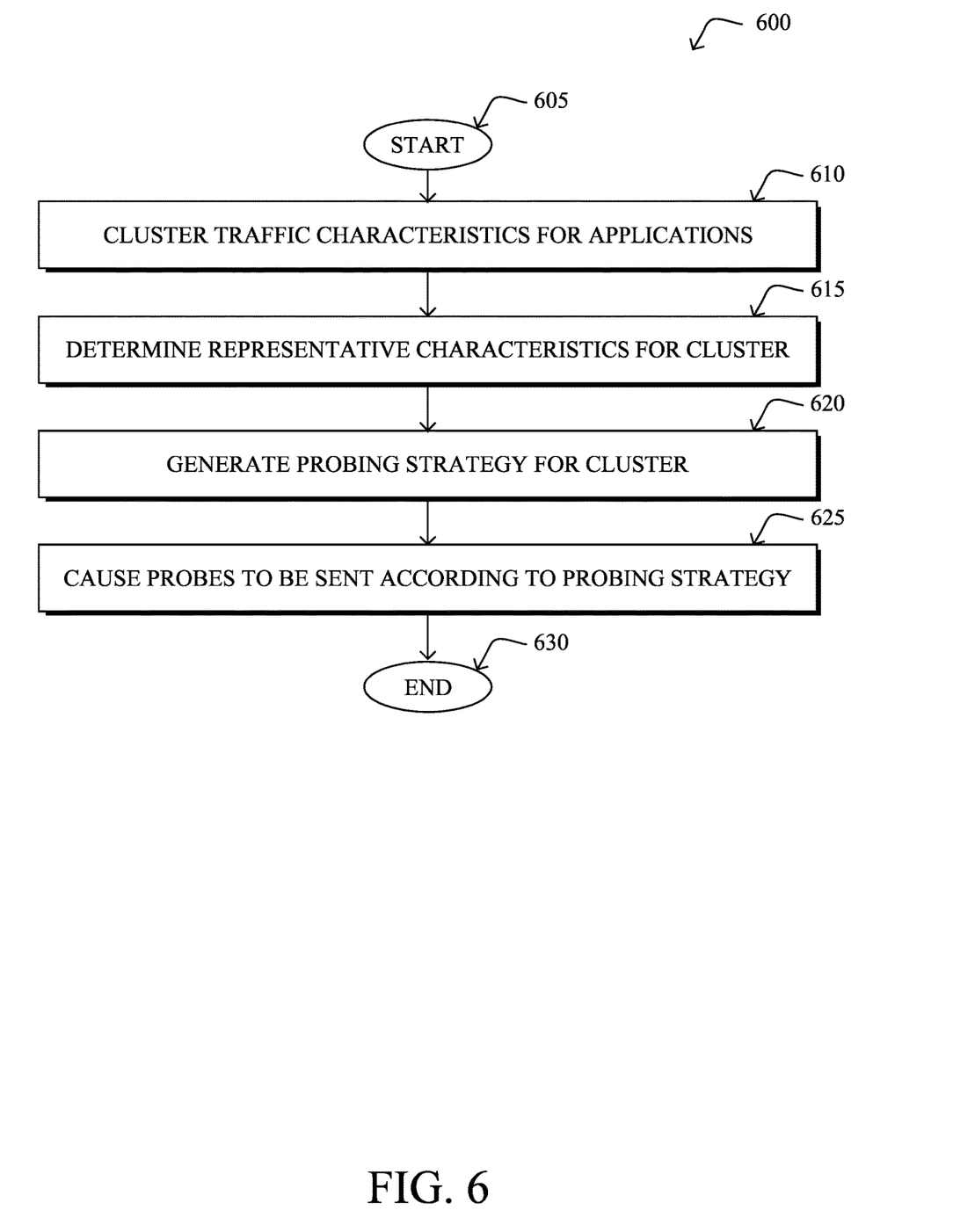
FIG. 6 illustrates an example simplified procedure for devising a probing strategy for a plurality of online applications.

FIG. 6 illustrates an example simplified procedure 600 (e.g., a method) procedure for devising a probing strategy for a plurality of online applications, in accordance with one or more embodiments described herein. For example, a non-generic, specifically configured device (e.g., device 200), such as controller for a network (e.g., an SDN controller or other device in communication therewith), may perform procedure 600 by executing stored instructions (e.g., probing process 249), to provide a supervisory service to a network. The procedure 600 may start at step 605, and continues to step 610, where, as described in greater detail above, the device may cluster traffic characteristics of traffic associated with a plurality of online applications into one or more clusters. In various embodiments, the traffic characteristics may be indicative of their path metrics (e.g., delay, loss, jitter, etc.), application QoE, geographic location(s) associated with the traffic, timing information, service information, user interaction information, or the like. To perform the clustering, the device may use any number of different clustering approaches, such as density-based clustering, k-means clustering, etc.

At step 615, as detailed above, the device may determine representative traffic characteristics for a particular cluster in the one or more clusters. For instance, if the particular cluster is associated with a particular geographic location, timing (e.g., time of day, day of the week, etc.), etc., the device may identify such traffic characteristics as representative of the set. In further embodiments, the device may also identify packet information for the traffic associated with the particular cluster, such as the protocols that they use (e.g., HTTP, etc.), their sizes, etc., so as to replicate the actual traffic during probing.

At step 620, the device may generate, based on the representative traffic characteristics, a probing strategy for the plurality of online applications associated with the particular cluster, as described in greater detail above. In various embodiments, such a strategy may specify when path probes are to be sent, a frequency at which the probes should be sent, the sender(s) for such probes, the path(s) to be probed, which routers or other networking equipment should send the probes, etc. In some embodiments, the device may also provide an indication of the probing strategy to a user interface for approval, prior to initiating any corresponding probing.

At step 625, as detailed above, the device may cause path probes to be sent along one or more network paths in accordance with the probing strategy. For instance, the device may instruct one or more routers or other networking equipment to begin sending path probes along paths to the online application(s), to test the performances of those paths. In further embodiments, the results of the path probes are used by an application-aware routing engine to make routing decisions for those online applications associated with the particular cluster. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to support the operations of a predictive routing engine through path probing, while attempting to limit the impact of the probing on the paths. More specifically, applications having similar traffic characteristics may be clustered, so that probes can be sent for an entire cluster, as opposed to probing each application associated with that cluster, individually.

While there have been shown and described illustrative embodiments that provide for application clustering to perform path probing, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   clustering, by a device, traffic characteristics of traffic associated with a plurality of online applications into one or more clusters;
   determining, by the device, representative traffic characteristics for a particular cluster in the one or more clusters;
   generating, by the device and based on the representative traffic characteristics, a probing strategy for the plurality of online applications associated with the particular cluster, wherein the probing strategy specifies at least a frequency at which path probes are to be sent that is determined based on the representative traffic characteristics; and
   causing, by the device, the path probes to be sent along one or more network paths in accordance with the probing strategy.

2. The method as in claim 1, wherein the traffic characteristics for the particular cluster indicate a common location associated with its traffic.

3. The method as in claim 1, wherein the traffic characteristics for the particular cluster indicate a common timeframe associated with its traffic.

4. The method as in claim 1, further comprising:
   receiving, at the device, a probing optimization request from a software-defined networking (SDN) controller that indicates the plurality of online applications.

5. The method as in claim 1, further comprising:
   re-performing, by the device, the clustering, in response to an indication that one or more of the plurality of online applications has moved locations.

6. The method as in claim 1, further comprising:
   re-performing, by the device, the clustering, in response to a determination that the one or more clusters are no longer valid.

7. The method as in claim 1, wherein generating the probing strategy comprises:
   providing, by the device, an indication of the probing strategy to a user interface for approval.

8. The method as in claim 1, wherein results of the path probes are used by an application-aware routing engine to make routing decisions for those online applications associated with the particular cluster.

9. The method as in claim 1, further comprising:
   providing, by the device, information regarding the particular cluster to a user interface; and
   receiving, at the device and via the user interface, approval of the particular cluster.

10. An apparatus, comprising:
    one or more network interfaces;
    a processor coupled to the one or more network interfaces and configured to execute one or more processes; and
    a memory configured to store a process that is executable by the processor, the process when executed configured to:
      cluster traffic characteristics of traffic associated with a plurality of online applications into one or more clusters;
      determine representative traffic characteristics for a particular cluster in the one or more clusters;
      generate, based on the representative traffic characteristics, a probing strategy for the plurality of online applications associated with the particular cluster, wherein the probing strategy specifies at least a frequency at which path probes are to be sent that is determined based on the representative traffic characteristics; and
      cause the path probes to be sent along one or more network paths in accordance with the probing strategy.

11. The apparatus as in claim 10, wherein the traffic characteristics for the particular cluster indicate a common location associated with its traffic.

12. The apparatus as in claim 10, wherein the traffic characteristics for the particular cluster indicate a common timeframe associated with its traffic.

13. The apparatus as in claim 10, wherein the process when executed is further configured to:
  receive a probing optimization request from a software-defined networking (SDN) controller that indicates the plurality of online applications.

14. The apparatus as in claim 10, wherein the process when executed is further configured to:
  re-perform clustering, in response to an indication that one or more of the plurality of online applications has moved locations.

15. The apparatus as in claim 10, wherein the process when executed is further configured to:
  re-perform the clustering, in response to a determination that the one or more clusters are no longer valid.

16. The apparatus as in claim 10, wherein the apparatus generates the probing strategy by:
  providing an indication of the probing strategy to a user interface for approval.

17. The apparatus as in claim 10, wherein results of the path probes are used by an application-aware routing engine to make routing decisions for those online applications associated with the particular cluster.

18. A tangible, non-transitory, computer-readable medium storing program instructions that cause a device to execute a process comprising:
  clustering, by the device, traffic characteristics of traffic associated with a plurality of online applications into one or more clusters;
  determining, by the device, representative traffic characteristics for a particular cluster in the one or more clusters;
  generating, by the device and based on the representative traffic characteristics, a probing strategy for the plurality of online applications associated with the particular cluster, wherein the probing strategy specifies at least a frequency at which path probes are to be sent that is determined based on the representative traffic characteristics; and
  causing, by the device, the path probes to be sent along one or more network paths in accordance with the probing strategy.

* * * * *

UNITED STATES PATENT AND TRADEMARK OFFICE
CERTIFICATE OF CORRECTION

PATENT NO. : 11,671,374 B2
APPLICATION NO. : 17/375209
DATED : June 6, 2023
INVENTOR(S) : Michal Wladyslaw Garcarz et al.

It is certified that error appears in the above-identified patent and that said Letters Patent is hereby corrected as shown below:

In the Specification

Column 7, Line 56, please amend as shown:
(e.g., ADSL, 4G, 5G, etc.) in all cases, as well as various Column 8, Line 45, please amend as shown:
Furthermore, the level of dynamicity observed in today's Column 11, Line 17, please amend as shown:
teristics, a probing strategy for the plurality of online Column 13, Line 9, please amend as shown:
Cluster 1: google_maps, google_earth, google_skymap Column 13, Line 24, please amend as shown:
clusters: Location = Poland/Warsaw between 16:00-18:00

Column 13, Line 28, please amend as shown:
drive, gmail_mobile, google_skymap

Signed and Sealed this
Fifth Day of September, 2023

Katherine Kelly Vidal
*Director of the United States Patent and Trademark Office*